(No Model.)
C. B. KING.
BRAKE BEAM.
No. 513,942. Patented Jan. 30, 1894.
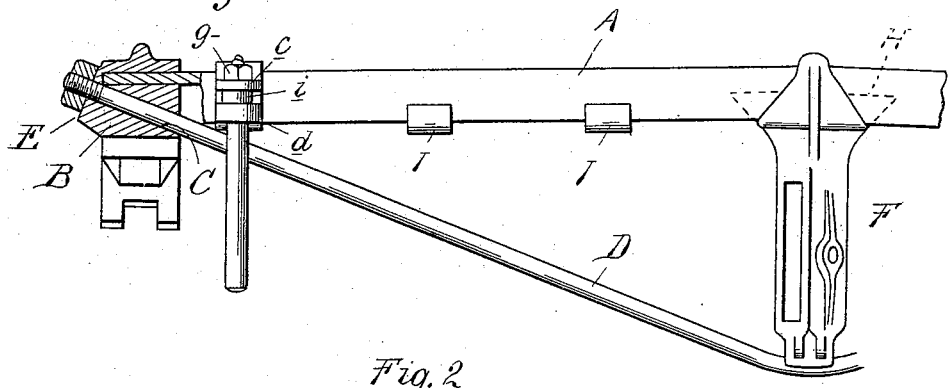
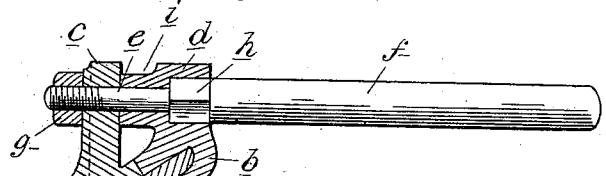
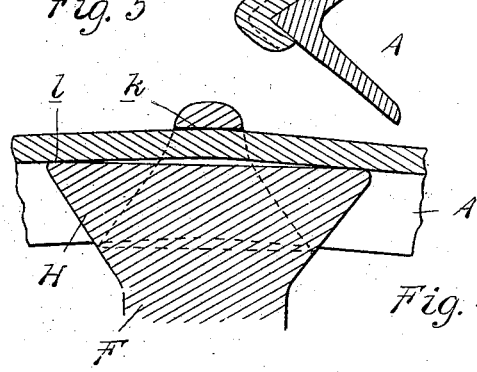
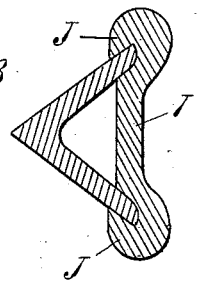
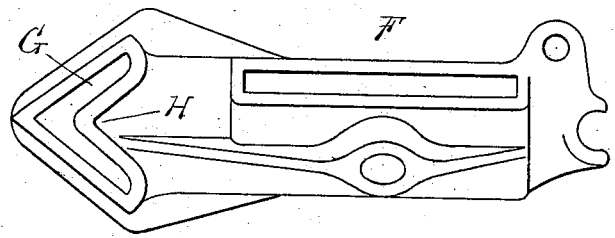
Witnesses:
P. M. Hulbert
N. L. Lindop
Inventor:
Charles B. King
By Tho. S. Sprague & Son
Attys.

UNITED STATES PATENT OFFICE.

CHARLES B. KING, OF DETROIT, MICHIGAN.

BRAKE-BEAM.

SPECIFICATION forming part of Letters Patent No. 513,942, dated January 30, 1894.

Application filed April 28, 1893. Serial No. 472,176. (No model.)

*To all whom it may concern:*

Be it known that I, CHARLES B. KING, a citizen of the United States, residing at Detroit, in the county of Wayne and State of Michigan, have invented certain new and useful Improvements in Brake-Beams, of which the following is a specification, reference being had therein to the accompanying drawings.

This invention consists in the peculiar construction of a beam of angle iron, brake shoes having angular sockets in which the ends of the beam engage, a truss rod having nuts bearing against the end of the beam and a strut; further, in the peculiar construction of the strut having an eye through which the beam is sleeved, and an inner head forming a filler block for the angle; further, in the peculiar construction of tie plates for the angle iron beam located between the strut and brake heads, and in the construction of the clamp for the finger guard, and further in the peculiar construction, arrangement and combination of the various parts, all as more fully hereinafter described.

In the drawings, Figure 1 is a plan view of my improved beam. Fig. 2 is a cross section, showing the clamp for the finger guard. Fig. 3 is a cross section through the beam and one of the intermediate tie plates. Fig. 4 is an elevation of the post or strut, and Fig. 5 is a horizontal section through the beam and post.

A is a beam of angle iron or steel, cut to the desired length and slightly cambered.

B are the brake heads, having V-shaped sockets in their inner faces, the V opening forwardly. The brake heads are also provided with a diagonal aperture C for the ends of the truss rod D. This aperture passes through the brake head between the wings of the angle iron, and through a cap or end plate E formed integral with the brake head at the end of the beam. The brake head has any suitable means for securing the shoe thereto.

F is a strut having an eye G at one end, through which the beam is sleeved. The head of the strut, forming the inner wall of the eye, is flanged to form a filler block H, fitting the inner face of the angle iron beam.

The post has any suitable means for pivoting the beam or other draft-connection.

Between the filler block or head H, and the brake-head, I preferably employ one or more tie plates I, for tying the edges of the wings together, and preferably construct these as shown in Fig. 3, having the lips J turned over the outer face of the beam, to hold them in position. These plates may be of malleable iron, and the lips J hammered in to lock them in position, or they may be riveted or otherwise secured to prevent end motion. These tie plates prevent the spreading of the wings under strain and enable me to use a much lighter material in the compression members than could be used if these were dispensed with.

The finger guard clamp consists of the two parts $a$ and $b$ having lips engaging over the opposite ends of one wing, that is one lip engages over the apex of the beam (which is an acute angled beam) and the other over the edge of the upper wing. These clamps have the upwardly extending lugs $c\ d$, which are apertured in line to receive the bolt $e$, of the finger guard $f$.

$g$ is the nut on the end of this bolt, which draws the squared shoulder $h$ tightly against the corresponding shoulder on the lug $d$ and clamps the two parts together and tightly upon the beam.

$i$ is a sleeve projecting from the inner face of the lug $d$ around the bolt and serves to hold the two lugs apart a sufficient distance to allow of engaging the safety chain beneath the sleeve. The beam shown herein consists of a single piece of angle iron with the edges of the wings arranged in a vertical plane, this beam being sleeved through an eye in the strut or post and engaging V-shaped sockets in the brake heads. These heads are provided with diagonal apertures through which passes the truss rod between the wings of the beam. The strain on the truss rods is brought directly against the ends of the beam. This structure is one which is not only light and strong, but is especially adapted to withstand the central vertical strains to which such a beam is subject.

In using a brake beam with the lever applied centrally of the post, the draft may not be horizontal, but up or down, more or less, which tends to bend the beam correspondingly at its central point. By making a beam composed of a single piece of angle iron extending from head to head, passing through a V- shaped socket in the post, the material is best disposed to resist these vertical strains. One wing extends upwardly from the apex of the beam and one downward-practically trussing it, while the socket at the middle ties the wings together and prevents "buckling" or spreading. If the beam were made in two halves connected at the middle, this strain would tend to separate the ends, while the sockets for such ends would add greatly to the weight, while detracting from the strength.

In Fig. 5, I have illustrated the arrangement of the beam in the eye of the strut or post. In constructing the strut with the enlarged head H extending at each side from said strut, I can make the eye through the strut comparatively large in proportion to the size of the beam, so that ordinary rough castings may be used, which makes it easy to sleeve the beam through the eye, but when the beam is cambered, the central portion will be forced out to have a bearing at $k$, while the intermediate portion will be forced against the point $l$ at the ends of the head H, clamping it tightly in position and preventing any possibility of end motion of the strut even if I employ no other means for holding the strut against end motion.

What I claim as my invention is—

1. A brake beam consisting of a single beam of angle iron arranged with the opening between the wings extending forwardly, a central post having formed integrally therewith a head having an aperture in which the beam is fitted, brake heads having sockets in which the ends of the beam engage, and a truss rod passing over the post and having a bearing on the brake heads at the end of the beam, passing between the wings thereof through the brake head, substantially as described.

2. In a brake beam, the combination of the angle iron beam, of the brake heads, a truss rod, a post, a head formed integral therewith, having an eye through which said beam is sleeved and the filler block on the end of said post for the inside of the beam substantially as described.

3. In a brake beam, the combination with an open angle beam, the brake heads, the truss rod and post, of the tie plates connecting the edges of the angle iron, substantially as and for the purpose described.

4. In a brake beam, the combination of the angle beam, of the two part clamp each part having hooks engaging over opposite ends of one of the wings, and a bolt for holding said clamping members in position upon the beam, substantially as described.

5. In a brake beam, the combination with the acute angled metal beam, of the finger guard clamp consisting of the parts $a\ b$, the hooks on said parts engaging over the angle of the beam and the edge of the upper wing respectively, the lugs $c\ d$ on said members, the clamping bolt $e$ passing through apertures therein, the finger guard $f$ formed by an extension of said bolt and a nut $g$, the parts arranged to operate, as and for the purpose described.

6. In a brake beam, the combination with the cambered angle iron beam, the brake heads, and the truss rod, of a post having an eye through which said beam is sleeved, of the head or filler block H, forming the inner face of said eye and extending some distance each side of the middle of said post to form the bearing $k$ and $l$, substantially as and for the purpose described.

In testimony whereof I affix my signature in presence of two witnesses.

CHARLES B. KING.

Witnesses:
JAMES WHITTEMORE,
M. B. O'DOGHERTY.